US006991131B2

(12) United States Patent
Maser

(10) Patent No.: US 6,991,131 B2
(45) Date of Patent: Jan. 31, 2006

(54) DISTRIBUTABLE CONTAINER AND SYSTEM AND METHOD USING DISTRIBUTABLE CONTAINER

(75) Inventor: Bryan A. Maser, Hugo, MN (US)

(73) Assignee: Ecolab, Inc., St. Paul, MN (US)

(*) Notice: Subject to any disclaimer, the term of this patent is extended or adjusted under 35 U.S.C. 154(b) by 130 days.

(21) Appl. No.: 10/653,673

(22) Filed: Sep. 2, 2003

(65) Prior Publication Data

US 2005/0045652 A1 Mar. 3, 2005

(51) Int. Cl.
*B65G 59/00* (2006.01)

(52) U.S. Cl. .................................... 221/263; 221/265

(58) Field of Classification Search ................ 221/265, 221/263

See application file for complete search history.

(56) References Cited

U.S. PATENT DOCUMENTS

| | | | | |
|---|---|---|---|---|
| 2,333,791 | A | 11/1943 | Hutchison, Jr. | |
| 3,412,254 | A | 11/1968 | Meyer-Dōering et al. | |
| 3,680,736 | A | 8/1972 | Viessmann | 221/14 |
| 3,760,166 | A | 9/1973 | Adams et al. | |
| 4,046,996 | A | 9/1977 | Williams et al. | |
| 4,211,517 | A | 7/1980 | Schmid | |
| 4,365,853 | A | 12/1982 | Ehrlich | |
| 4,396,828 | A | 8/1983 | Dino et al. | |
| 4,573,606 | A | 3/1986 | Lewis et al. | |
| 4,597,091 | A | 6/1986 | Blake | |
| 4,662,538 | A * | 5/1987 | Goudy et al. | 221/265 |
| 4,676,399 | A | 6/1987 | Burckhardt | |
| 4,711,370 | A | 12/1987 | Goudy, Jr. et al. | |
| 4,756,321 | A | 7/1988 | Livingston et al. | |
| 4,980,292 | A | 12/1990 | Elbert et al. | |
| 5,014,877 | A * | 5/1991 | Roos | 221/265 |

(Continued)

FOREIGN PATENT DOCUMENTS

| | | |
|---|---|---|
| CA | 2189115 | 10/1996 |
| DE | 195 40 958 A1 | 5/1997 |
| DE | 196 20 088 A1 | 11/1997 |
| DE | 197 37 030 C1 | 11/1998 |

(Continued)

OTHER PUBLICATIONS

International Search Report dated Jan. 19, 2005.

(Continued)

*Primary Examiner*—Kenneth Noland
(74) *Attorney, Agent, or Firm*—Merchant & Gould

(57) ABSTRACT

A container, method and system for dispensing a solid product held in a distributable container having an opening. A mechanical interlock secures the opening of the container preventing contact with the solid product by a user. A dispenser, fixed at a dispensing location, is adapted to receive the mechanical interlock of the container. A power source is operatively coupled to the dispenser and adapted to power the mechanical interlock allowing dispensing of the solid product from the container.

28 Claims, 13 Drawing Sheets

U.S. PATENT DOCUMENTS

| | | | | |
|---|---|---|---|---|
| 5,035,237 | A | 7/1991 | Newell et al. | 128/203.15 |
| 5,064,094 | A * | 11/1991 | Roos et al. | 221/265 |
| 5,147,615 | A | 9/1992 | Bird et al. | |
| 5,158,778 | A | 10/1992 | Donovan et al. | |
| 5,384,364 | A | 1/1995 | Besse et al. | |
| 5,500,050 | A | 3/1996 | Chan et al. | |
| 5,534,178 | A | 7/1996 | Bailly et al. | |
| 5,638,417 | A | 6/1997 | Boyer et al. | |
| 5,671,262 | A | 9/1997 | Boyer et al. | |
| 5,829,085 | A | 11/1998 | Jerg et al. | 8/158 |
| 6,425,888 | B1 | 7/2002 | Embleton et al. | 604/290 |
| 6,547,097 | B1 | 4/2003 | Cavallaro et al. | |

FOREIGN PATENT DOCUMENTS

| | | | |
|---|---|---|---|
| EP | 1174363 | 1/2002 | 83/4 |
| JP | 05331497 | 12/1993 | |
| WO | WO 98/26704 | 6/1998 | |
| WO | WO 02/058528 * | 8/2002 | |
| WO | WO 02/058528 A | 8/2002 | |
| WO | WO 03/023120 A1 | 3/2003 | |
| WO | WO 03/059143 A1 | 7/2003 | |

OTHER PUBLICATIONS

Copy of International Search Report in Foreign Patent Document EP 1 159 913 A.

Copy of International Search Report in Foreign Patent Document WO 02/058528 A.

Copy of International Search Report in Foreign Patent Document WO 03/023120 A1.

U.S. Appl. No. 10/429,486, filed May 5, 2003, Bradley et al.

* cited by examiner

DISTRIBUTABLE CONTAINER AND SYSTEM AND METHOD USING DISTRIBUTABLE CONTAINER

TECHNICAL FIELD

This invention relates to a system for dispensing an active ingredient using a dispensable tablet, the dispensable tablet and a container for holding such dispensable tablets.

BACKGROUND

Automated machines are often used for cleaning dishes, utensils, kitchen items, pots and pans, etc. These automated machines, commonly called warewashing machines, are often used by commercial establishments such as restaurants. A typical warewashing machine may use an active ingredient found in a detergent, rinse aid or sanitizer.

For a sanitizer, an active ingredient, such as chlorine, may be supplied in powdered or solid block form. A warewashing machine presents an adverse environment for such powdered or solid active ingredients. Since the active ingredient must react and dissolve quickly in water used in the warewashing machine, the solid or powdered active ingredients should be formulated to easily dissolve. However, this desired ability to dissolve quickly when used is a liability while the solid or powdered active ingredient has not yet been dispensed. The very wet and high temperature environment of the warewashing machine can degrade the solid or powdered active ingredients. If such wet and/or high temperature environment should come into contact with the active ingredient before being dispensed into the warewashing machine deleterious effects may result.

A relatively large, e.g., 600 gram, solid block can be utilized with a flood-type dispenser. As the ingredient in the solid is needed, the dispenser floods the solid block for a specified period of time with water. As water floods the solid block, the solid block erodes providing an ingredient/water solution using a portion of the solid block that has been eroded. Some, perhaps much, of the solid block remains for use in subsequent cycles of the machine to which the dispenser operates. During subsequent cycles, the solid block may again be flooded with water and the process is repeated.

However, some problems exist with this arrangement. Because of variations in water temperature, more or less of the active ingredient, e.g., chlorine, can be eroded from the solid block. For example, a lower water temperature will erode less chlorine from the solid block in the predetermined period of time allotted. However, a higher water temperature will erode more chlorine from the solid block in the same predetermined period of time. Depending upon the water temperature, either too much or too little chlorine may be used to produce a desired sanitizing solution.

Other forms of active ingredient dispensers also exist in the warewashing machine environment.

Powdered detergent is typically individually manually metered or poured into the warewashing machine. This, however, results in the non-uniform dose of detergent for the warewashing machine which is highly variable based upon the person performing the manual dispensing operation. Further, it is possible that the user could come into contact with the active ingredient which could raise a safety issue.

Alternatively, a tablet of detergent may be manually placed into a warewashing machine. While placing a tablet of detergent into the warewashing machine does provide a uniform dose, this dispensing system also requires the user to handle a tablet in order to manually place the tablet into the warewashing machine.

Another technique for dispensing an ingredient is known in the industry as a blister pack. A blister pack, well known in the industry, consists of a plastic top, typically clear, formed with indentations with each indentation capable of holding an individual dose of tablet or tablets. A backing sheet is adhered over the plastic top to secure the tablets in the indentations. A user may then take the blister pack and, pushing on the plastic top at an indentation, push an individual tablet or tablets contained in an indentation through the backing sheet, perforating the backing sheet, and releasing the tablet or tablets. While this technique also provides for uniform dose, it also could allow the user to come in contact with the tablet being dispensed. Most importantly, dispensing of tablets with a blister pack is an intensely manual operation.

PCT International Publication Number WO 02/058528, Hindustan Lever Limited, Detergent Dispenser System, describes a removable cartridge for a detergent dispensing system for a dishwasher. A storage unit contains a plurality of cylindrical or spherical detergent tablets arranged in two or more rows with curved surfaces of adjacent tablets touching such that when the cartridge is upright that tablets will move under gravity towards the transfer station. The transfer station has an ejection means to eject a tablet from the transfer station through a transfer port to prevent ingress of moisture into the cartridge. The dispensing system of Hindustan recognizes the problem of moisture contamination. Hindustan attempts to have the dispensing mechanism handle all of the responsibility of preventing the moisture from contaminating the dispensing container. However, Hindustan does not solve the problem because even a little moisture or extreme humidity can then contaminate not only the tablet being dispensed but literally the whole cartridge (container) of tablets.

Some tablets being dispensed may be fragile or the active ingredient may be toxic to a user. In this case, allowing a user to contact or directly interact with solid product, including tablets, can be a significant disadvantage.

Further, some tablets and some active ingredients may contaminate the dispenser over time. Continued dispensing of multiple containers of solid product can, especially over time, cause significant contamination of the dispensing mechanism and can lead to deleterious operation including decreased reliability.

SUMMARY OF THE INVENTION

In one embodiment, the present invention provides a system for dispensing a solid product held in a distributable container having an opening. A mechanical interlock secures the opening of the container preventing contact with the solid product by a user. A dispenser, fixed at a dispensing location, is adapted to receive the mechanical interlock of the container. A power source is operatively coupled to the dispenser and adapted to power the mechanical interlock allowing dispensing of the solid product from the container.

In a preferred embodiment, the invention further provides a cleaning machine operatively coupled to the dispenser and adapted to receive the solid product dispensed from the dispenser.

In a preferred embodiment, the opening of the container is circular. A circular cap is adapted to fit over and secure the opening of the container, the circular cap having a central axis and having an opening therein positioned off-center from the central axis. A shaft operatively cooperates with the circular cap and is adapted to be coupled to the power source. A disc is rotatably coupled with the shaft positioned adjacent the circular cap nearest the solid product in the container. The disc has at least one opening therein cooperating with the opening of the circular cap at an angular position upon rotation of the disc.

In another embodiment, the present invention provides a distributable container for holding a solid product and adapted to mate with a dispenser fixed at a dispensing location and having a power source. A receptacle having an opening holding the solid product. A mechanical interlock secures the opening of the receptacle preventing contact with the solid product by a user. The mechanical interlock is adapted to mate with the dispenser and dispense the solid product using the power source.

In another embodiment, the present invention provides a method of dispensing a solid product from a distributable container having a mechanical interlock preventing contact with the solid product by a user to a dispenser fixed at a dispensing location. The container holding the solid product is distributed to the dispensing location. The mechanical interlock of the container is mated with the dispenser. Power from the dispenser is provided to the mechanical interlock to controllably dispense the solid product allowing the dispenser to dispense a predetermined amount of the solid product from the container without allowing contact of the solid product with the user.

In a preferred embodiment, the mechanical interlock substantially prevents moisture from the dispenser from affecting the solid product.

In a preferred embodiment, the solid product is a plurality of tablets.

In a preferred embodiment, the plurality of tablets can be dispensed one at a time.

In a preferred embodiment, the mechanical interlock is fixedly secured to the container.

In a preferred embodiment, the power source provides rotary motion to the mechanical interlock.

In a preferred embodiment, the solid product is bleach.

In a preferred embodiment, the solid product is rinse aid.

In a preferred embodiment, the solid product is detergent.

DETAILED DESCRIPTION

The present invention uses granular chlorine in a commercial warewashing environment. The preferred ingredients are sodium dichloro-s-triazinetrione dihydrate or sodium dichloroisocyanurate dihydrate.

Figure 1:
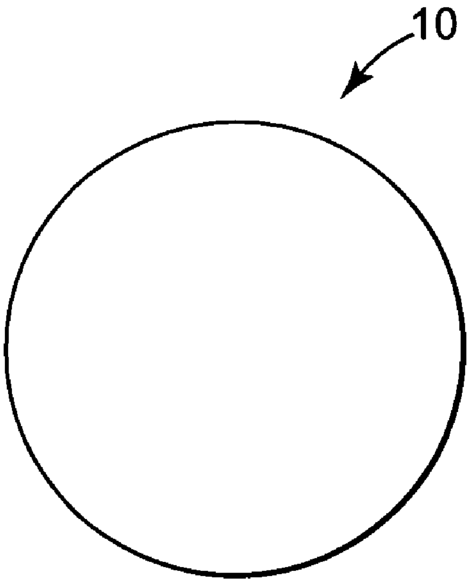
FIG. 1 shows a preferred embodiment of a dispensable tablet in accordance with the present invention.

In a preferred embodiment, the active ingredient, in this example, chlorine, is contained in dispensable tablet 10, shown in cross-sectional view in FIG. 1. In order to avoid the problem of how much active ingredient to dispense into the warewashing machine, dispensable tablet 10 can be constructed to contain exactly the unit dose desired for optimum operation of the warewashing machine. Thus, when an operation of the warewashing machine needs an optimum dose of the active ingredient a single dispensable tablet 10 may be dispensed to the warewashing machine ensuring the proper dosage.

Alternatively, the unit dose desired for optimum operation of the warewashing machine can be contained in two or more of dispensable tablets 10 as long as an integral number of dispensable tablets 10 contain the intended dose for the warewashing machine. For example, if the intended dose for the warewashing machine is contained in two of dispensable tablets 10, then two dispensable tablets 10 can be dispensed when required. Of course, reasonableness is preferred in the number of dispensable tablets 10 the intended dose for the warewashing machine. As the number of dispensable tablets 10 over which the intended dose for the warewashing machine is spread, the more difficult it is to count the number of dispensable tablets 10 which must be dispensed and to actually dispense that number of dispensable tablets 10. For this reason, it is preferred that the number of dispensable tablets 10 over which the intended dose for the warewashing machine is spread be limited to not more than ten.

It is recognized that while it is preferred that a unit dose for the warewashing machine be contained in a single dispensable tablet 10, or in a plurality of dispensable tablets 10, that the warewashing machine could require differing amounts of the active ingredient during different cycles or with different options of single cycle. For example, the warewashing machine could require a single dispensable tablet 10 when operating in a normal mode and could require two or more dispensable tablets 10 when operating in a heavy duty mode. Nevertheless, at least one cycle of the warewashing machine in at least one mode operates with an intended dose of the active ingredient contained in a plurality of dispensable tablets 10, preferably not more than ten dispensable tablets 10.

Figure 2:
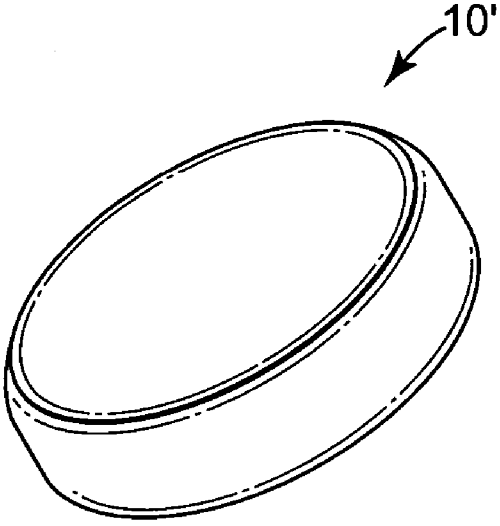
FIG. 2 shows an alternative embodiment of a dispensable tablet in accordance with the present invention.

Dispensable tablet 10 illustrated in FIG. 1 is spherical in shape. Other generally rounded shapes for dispensable tablet 10 are also contemplated. For example, dispensable tablet 10' illustrated in FIG. 2 is of a generally disc shape, preferably with slightly rounded edges. This shape can also be compared to the common shape of medicinal tablet, such as an aspirin tablet. Dispensable tablet 10 and 10' have generally rounded shapes in order that dispensable tablets 10 and 10' may be more easily dispensed through automated dispensing equipment. It is also desirable that dispensable tablets 10 and 10' have generally rounded shapes so that dispensable tablets 10 and 10' do not have sharp corners, e.g., ninety degree three dimensional corners, which are subject to breakage as dispensable tablets 10 and 10' are handled, both manually and with automated equipment but especially with automated equipment.

The preferred size for dispensable tablet 10' is an approximately 0.7 gram tablet, plus or minus 0.5 grams, having a diameter of approximately 0.3750 inches (9.52 millimeters with a height of approximately 0.2205 inches (5.59 millimeters).

While dispensable tablet of the present invention may be any of a variety of shapes, two of the preferred shapes are illustrated in FIG. 1 as dispensable tablet 10 and in FIG. 2 as dispensable tablets 10'. It is to be recognized and understood that other shapes are possible. The remainder of the discussion in this disclosure will be made to dispensable tablet 10 but applies equally well to dispensable tablet 10' and to a variety of shapes not specifically illustrated, for example elliptical shapes.

Since dispensable tablet 10 is a tablet, the active ingredient contained in dispensable tablet 10 is in solid form. In order that the active ingredient in dispensable tablet 10 can be utilized in the warewashing machine, dispensable tablet 10 should be readily dissolvable in the solution operatively utilized during operation of the warewashing machine. It is desirable that dispensable tablet 10 dissolve quickly in water so that the active ingredient can be effectively utilized by the warewashing machine. Dispensable tablet 10 should also be food contact safe.

However, since a warewashing machine often utilizes very hot water in order to accomplish its washing and/or sterilizing functions, the environment of the warewashing machine often contains very high humidities and, often, high temperatures. While this environment is conducive to effective washing and even to effective dissolving of dispensable tablet 10 once dispensed into the warewashing machine, such environment must be prevented from adversely affecting dispensable tablets 10 which have not yet been dispensed into the warewashing machine. As will be seen, part of the function of preventing moisture and, preferably, heat from affecting the supply of non-dispensed dispensable tablets 10 is accomplished in the dispensing apparatus. It is, however, also desirable that additional protection be taken to prevent the adverse effect of moisture and, preferably, heat on dispensable tablets 10 which have not yet been dispensed.

Figure 3:
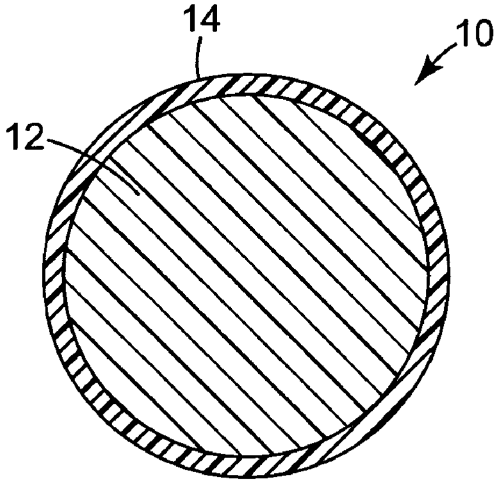
FIG. 3 is a cross-sectional view of the dispensable tablet of FIG. 1.

FIG. 3 is a cross-sectional view of dispensable tablet 10. The active ingredient is contained in the interior portion 12 of dispensable tablet 10. In a preferred embodiment, interior portion 12 of dispensable tablet 10 is a 0.7 gram spherical ball having a concentration of 70 parts per million consisting of fifty-six percent (56%) chlorine dry bleach for a tank size of the warewashing machine of approximately two (2) gallons (7.6 liters).

Other examples of active ingredients are pH modifiers, surfactants, enzymes, builders, lime away products, coupling agents, metal salts and components of rinse aids, detergents and sanitizers.

Dispensable tablet 10 also may have protective coating 14 surrounding the exterior of interior portion 12. Protective coating 14 can be made of a number of materials which can protect dispensable tablet from moisture, e.g., high humidity, and, preferably, heat when dispensable tablet is not yet dispensed. However, protective coating 14 can not be so protective that dispensable tablet 10 does not readily dissolve when dispensed into the warewashing machine. Protective coating 14 also protects dispensable tablet from mechanical breakage during shipping and dispensing. An example of a protective coating 14 is titanium dioxide coated from enzymes having an approximate thickness of the human hair, or approximately 0.1 millimeter. It is preferred that protecting be applied either by spraying or dipping.

It is also possible that interior portion 12 of dispensable tablet 10 could be in liquid or semi-liquid form with protective coating 14 forming a dissolvable shell around interior portion 12. This is similar to a paintball or bath beads in construction (although, obviously, paint is not utilized in a warewashing environment). In this embodiment, a liquid detergent or a liquid sanitizer could be used as the active ingredient. Once dispensed, again protective coating 14 would dissolve in the warewashing machine and the active ingredient contained in interior portion 12 would be released into the warewashing machine. Other examples of alternative forms of dispensable tablets 10 include gel tabs, a liquid or semi-liquid active ingredient contained in a water soluble film and a powder containing an active ingredient contained in a water soluble film. Other forms of packaging an active ingredient, e.g., a liquid or a powder, in a packet or other individualized container are also contemplated.

Figure 4:
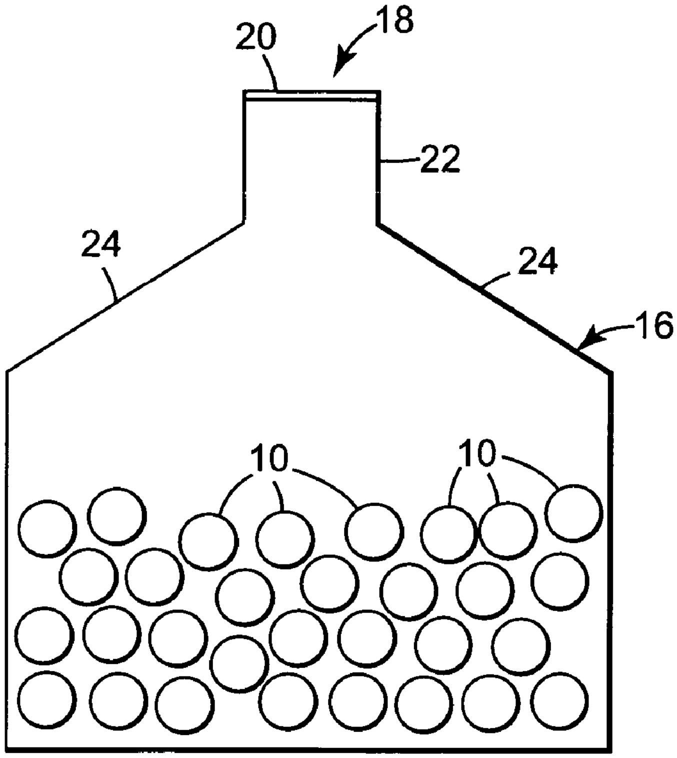
FIG. 4 illustrates a container holding a plurality of dispensable tablets in accordance with an embodiment of the present invention.

FIG. 4 illustrates container 16 holding a plurality of dispensable tablets 10. Container 16 has a relatively narrow opening 18, preferably sealed, for example with foil 20. With dispensable tablets 10 held in container 16, especially with foil 20 sealing opening 18, a user of the warewashing machine is protected from contacting dispensable tablets 10. Since the active ingredient contained in dispensable tablets 10 can be caustic to humans, preventing a user or another person coming into contact with tablets 10 in container 16, e.g., a child, is desirable. Sealing container 16 with foil 20 also prevents an unskillful user from inadvertently coming into contact with dispensable tablets 10 as, for example, by simply unscrewing a screw-on lid. Container 16 has a relatively narrow neck 22 which allows container 16 to be inserted into a dispenser. Container 16 also has sloping side walls 24 which assist in enabling dispensable tablets 10 to flow toward opening 18 when container 16 is inverted and inserted into a dispenser.

Figure 5:
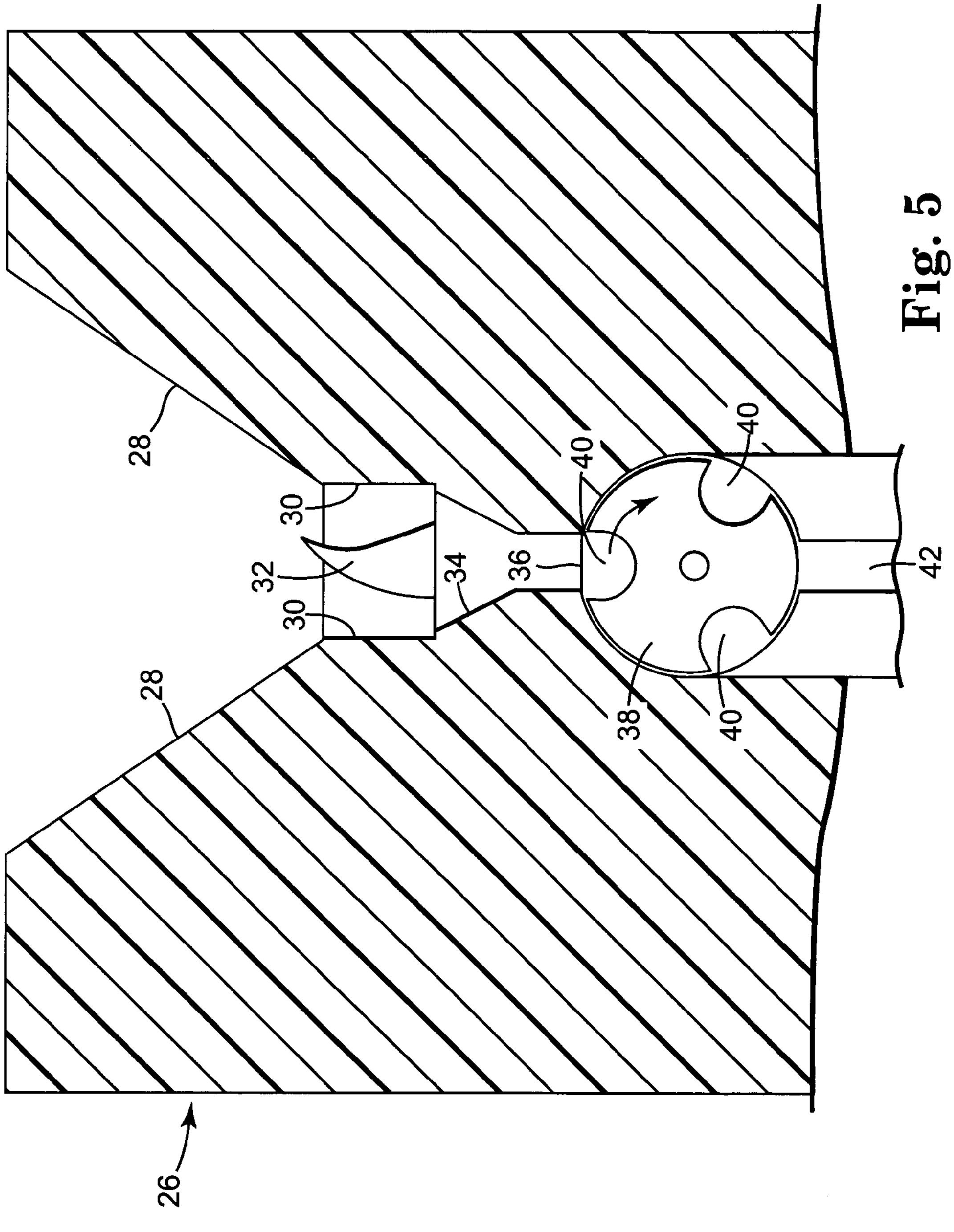
FIG. 5 is a cross-sectional view of a dispenser in accordance with an embodiment of the present invention and adapted for use with both a dispensable tablet and a container of dispensable tablets in accordance with preferred aspects of the present invention.

FIG. 5 shows dispenser 26 adapted to dispense dispensable tablets 10. Dispenser 26 has sloping walls 28 adapted to mate with sloping side walls 24 of container 16. Neck 22 of container 16 is accommodated with a corresponding receptacle 30 in dispenser 26. Projection 32 is adapted to penetrate foil 20 seal of container 16 and release dispensable tablets 10 from container 16. Restriction section 34 funnels dispensable tablets 10 so that, at the lower end of restriction 34 only a single dispensable tablet 10 is allowed to pass at a time. Restriction 34 has an opening 36 adapted to mate with rotatable disc 38. Rotatable disc 38 rotates in a housing of dispenser 26 just slightly larger than rotatable disc 26.

Rotatable disc 38 has at least one, and in this example, three, openings 40 sized to allow a single dispensable tablet 10 to fall from container 16 through restriction 34 into one of openings 40. A rotatable disc rotates a single dispensable tablet 10 accompanies each opening 40. As an opening 40 reaches the bottom of rotatable disc 40, a dispensable tablet 10 is released into passage 42 which is adapted to communicate with the warewashing machine into which dispensable tablet 10 is to be dispensed.

Figure 6:
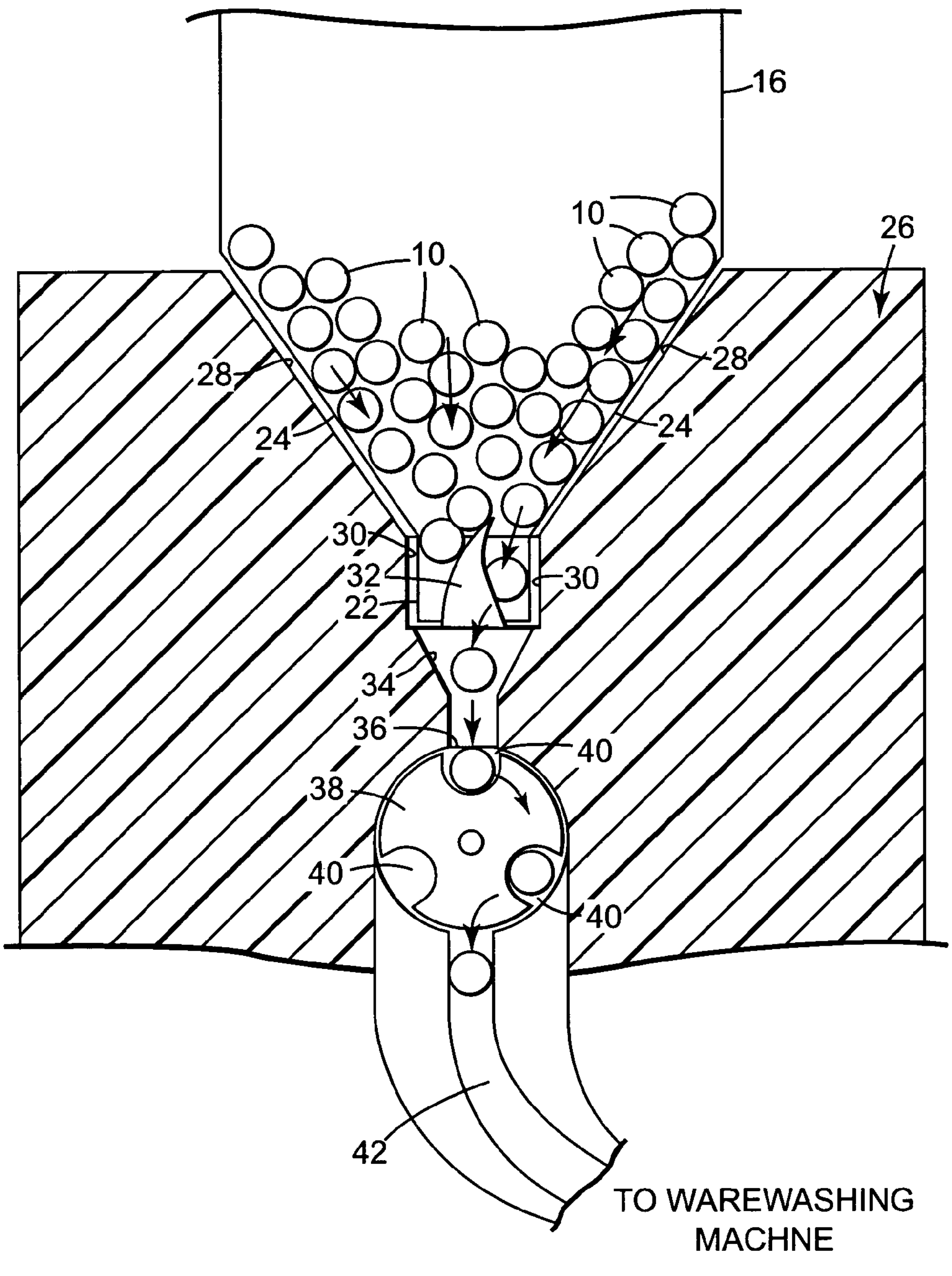
FIG. 6 illustrates the dispenser of FIG. 5 with dispensable tablets being dispensed from a container in accordance with preferred aspects of the present invention.
Figure 7:
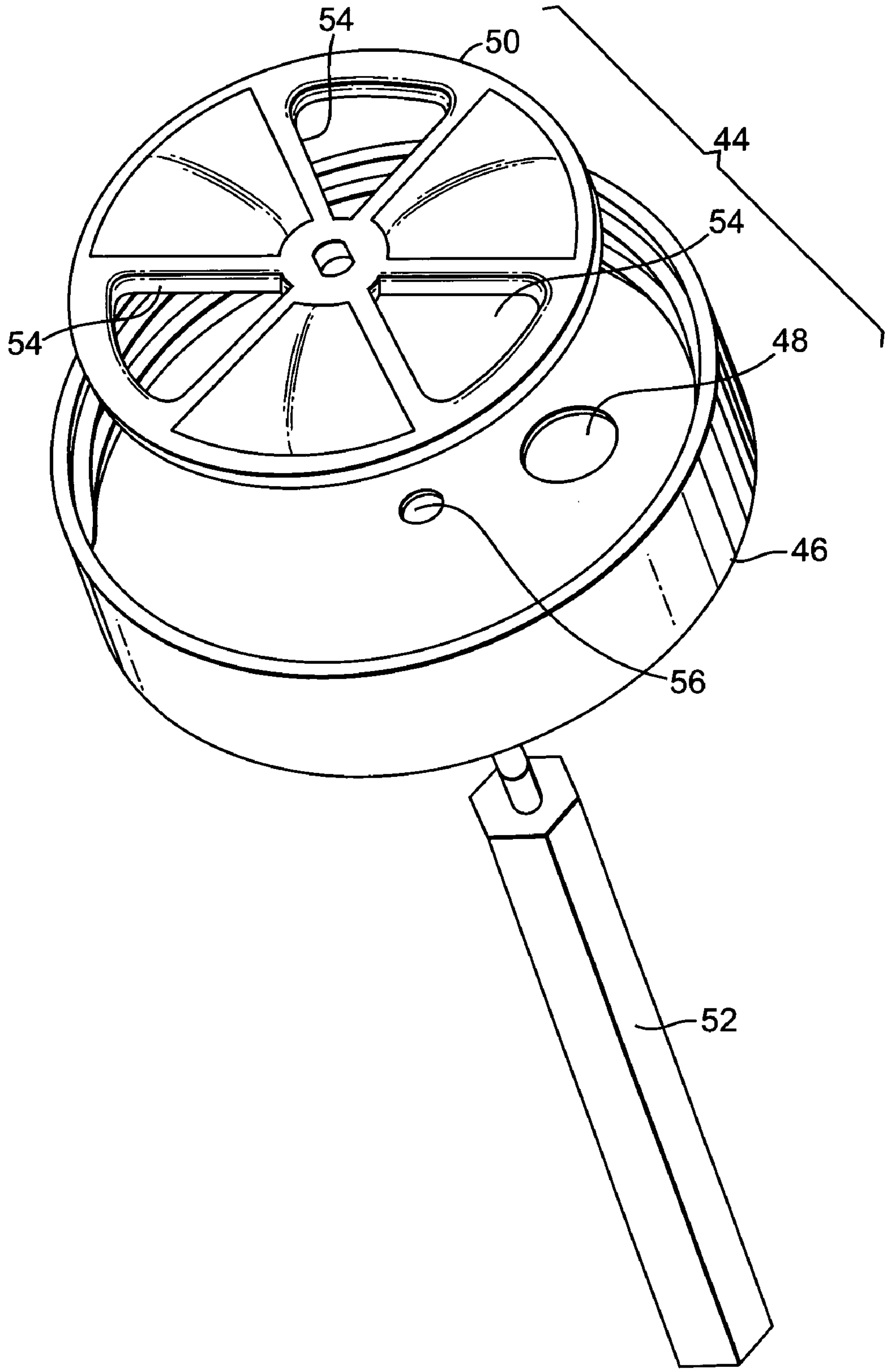
FIG. 7 is an exploded, perspective view of a closure or mechanical interlock for a distributable container in accordance with an embodiment of the present invention along with a shaft used to provide power to the closure.
Figure 8:
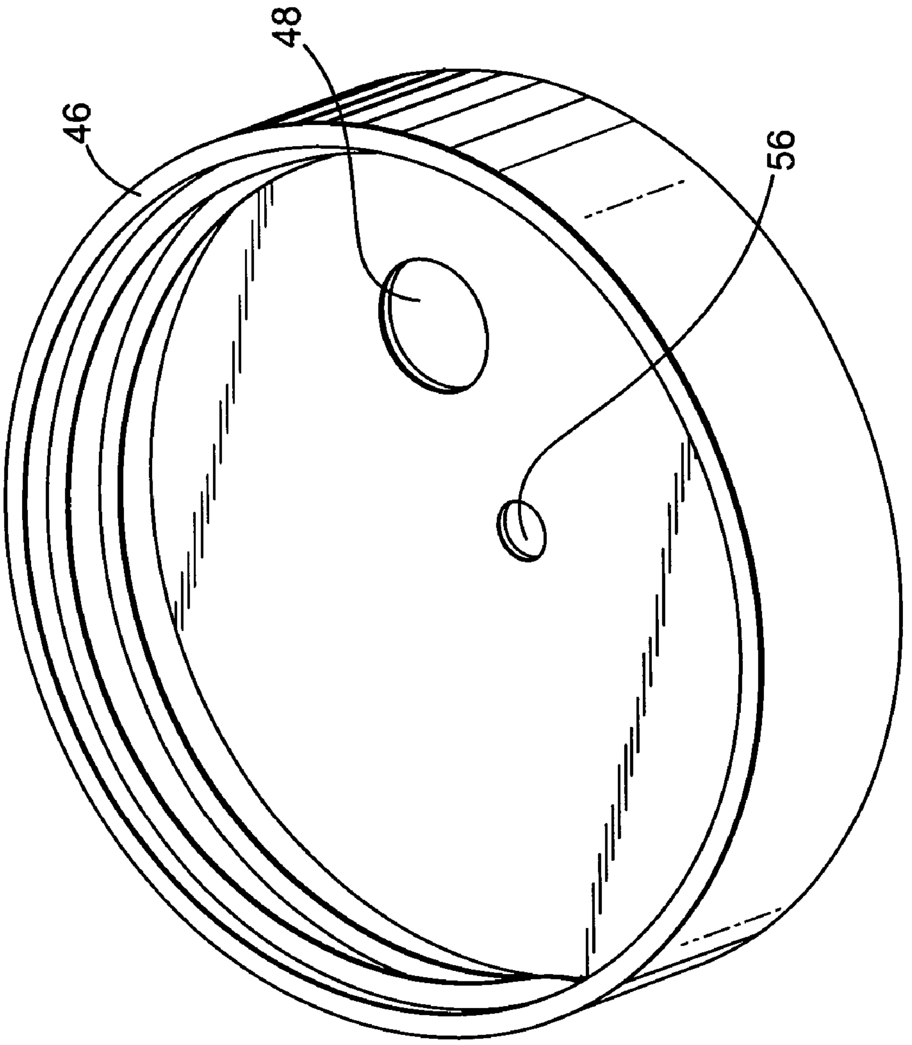
FIG. 8 is a cap used in the closure of FIG. 7.
Figure 9:
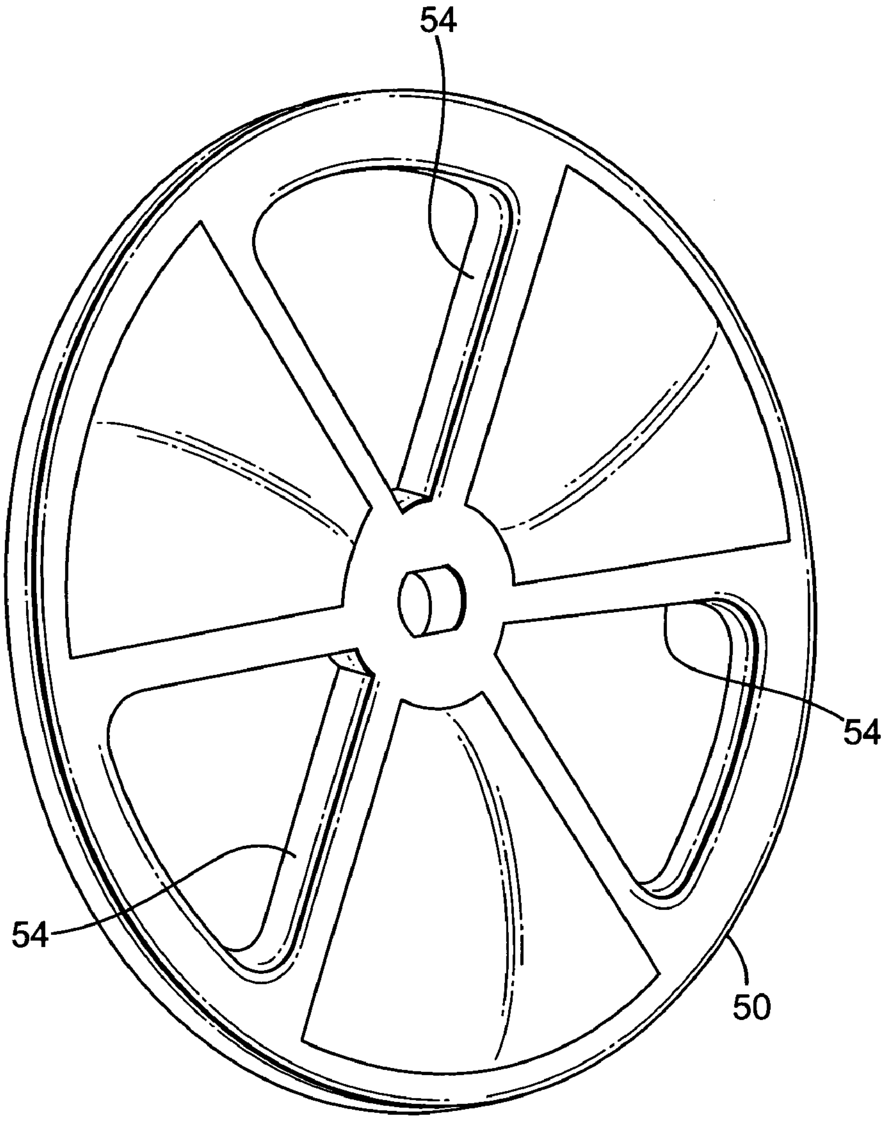
FIG. 9 is an internal disk used in the closure of FIG. 7.
Figure 10:
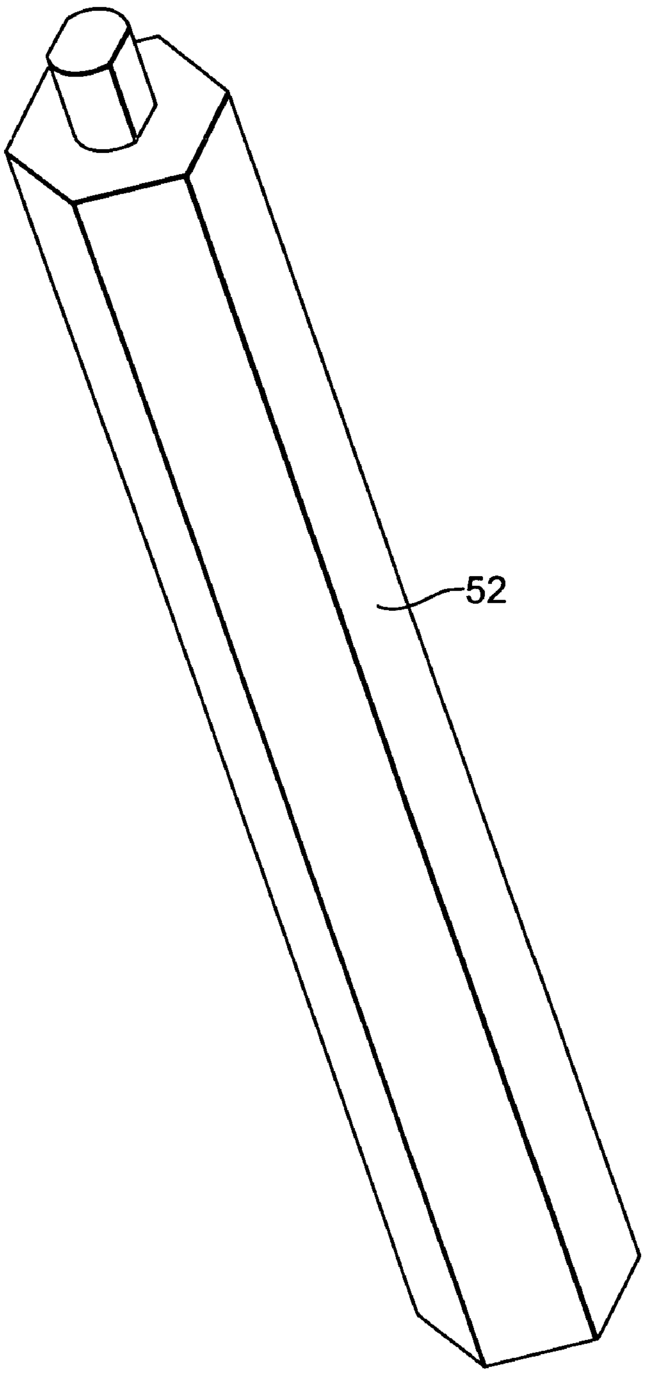
FIG. 10 is a shaft used to provide power to the closure of FIG. 7.

FIG. 6 shows container 16 having been inverted and inserted into dispenser 26. Dispenser 26 has mating sloping walls 28 adapted to facilitate the insertion of and support of sloping side walls 24 of container 16. Neck 22 of container 16 is accommodated with a corresponding receptacle 30 in dispenser 26. As neck 22 of container 16 is inserted into receptacle 30 of dispenser 26, projection 32 penetrates foil 20 of container 16 puncturing foil 20 and releasing dispensable tablets 10 from container 16. Dispensable tablets 10 are funneled in restriction section 34 so that, at the lower end of restriction 34 only a single dispensable tablet 10 is allowed to pass at a time. Restriction 34 has an opening 36 adapted to mate with rotatable disc 38. Rotatable disc 38 rotates in a housing of dispenser 26 just slightly larger than rotatable disc 26. Rotatable disc 38 has at least one, and in this example, three, openings 40 sized to allow a single dispensable tablet 10 to fall from container 16 through restriction 34 into one of openings 40. A rotatable disc rotates a single dispensable tablet 10 accompanies each opening 40. As an opening 40 reaches the bottom of rotatable disc 40, a dispensable tablet 10 is released into passage 42 which is adapted to communicate with the warewashing machine into which dispensable tablet 10 is to be dispensed.

Thus, as rotatable disc 38 is rotated so that the next opening 40 in rotatable disc reaches the bottom another dispensable tablet 10 is released into the warewashing machine through passage 42. Since dispensable tablets 10 still being held in container 16 are physically remote from passage 42, which may be contaminated with moisture from the warewashing machine, for example, and because any moisture laden air is prevented from directly being passed into container 16 by rotatable disc 38, dispenser 16 aids in preventing dispensable tablets 10 still being held in container 16 from being affected by the adverse high moisture content of the warewashing machine to which dispenser 26 is adapted to be utilized.

Of course, it is to be recognized and understood that if the intended dose for the warewashing machine calls for more than one dispensable ball 10, that rotatable discs is rotated through exactly the number of openings 40 for which the intended dose calls.

Rotatable disc 38 may be operated automatically through any number of commonly available and readily understood automated mechanical turning mechanisms. Alternatively, rotatable disc 38 may also be operated manually by the user.

FIG. 7, FIG. 8, FIG. 9 and FIG. 10 illustrate an embodiment of a closure 44 for container 16 holding solid product, e.g., dispensable tablets 10. Cap 46 is secured to opening 18 of container 16 by any suitable means, such as by screw threads. Preferably, cap 46 is fixedly secured, meaning that cap 46 is secured to container 16 in a way which would make it difficult for a user to remove cap 46. An example of being fixedly secured would be by press fitting grooves or ridges in cap 46 with corresponding ridges or grooves, respectively, in container 16. Preferably, such ridges and grooves would be back angled, or under cut, to allow cap 46 to snap onto container 16 but make it difficult to remove cap 46 from container 16. Another example would be by use of an adhesive. Preferably, although cap 46 would be fixedly secured to container 16 making it difficult for a user to remove cap 46 from container 16, cap 46 would be secured in a way that would allow a qualified service provider, maintenance person or factory refiller to remove cap 46 with proper tools, perhaps tools not readily available to a user.

Cap 46 has at least one off-center opening 48 appropriately sized to allow passage of a tablet 10. Internal disk 50 is adapted to be mounted on rotatable shaft 52 co-axially with cap 46. Internal disk 50 has at least one off-center opening 52 appropriately sized to allow passage of a tablet 10. In this embodiment, internal disk 50 has three openings 52.

In operation, rotatable shaft 52 of closure 44 can be mated to a power source in a dispenser with opening 18 of container 16, and hence closure 44, being oriented generally downwardly with respect to container 16. While container 16 does not need to be directly inverted with opening 18 on the bottom of container, it is desired that container 16 be oriented such that gravity will allow tablets 10 to be dispensed from container 16. For example, opening 18 of container 16 need only be lower than some of tablets 10 contained in container 16.

As rotatable shaft 52 is rotated, one of openings 54 of internal disk 50 will align with opening 48 in cap 46 which will allow a tablet 10 to fall by gravity through the combined openings and be dispensed from container 16. Preferably, each time one of openings 54 of internal disk 50 align with opening 48 in cap 46, a tablet 10 will be dispensed. Of course, if the rotation of rotatable shaft 52, and hence the rotation of internal disk 50, is slow enough then more than one tablet 10 may be dispensed each time one of openings 54 of internal disk 50 aligns with opening 48 in cap 46. The number of tablets dispensed can be controlled by varying the rotational speed of rotatable shaft 52 and internal disk 52. The number of rotations, or partial rotations, of rotatable shaft 52 and internal disk 50 determines the number of tablets 10 dispensed. When rotation stops, dispensing will stop. Care should be taken, of course, to stop the rotation of rotatable shaft 52 when one of openings 54 in internal disk do not align with opening 48 of cap 46.

Figure 11:
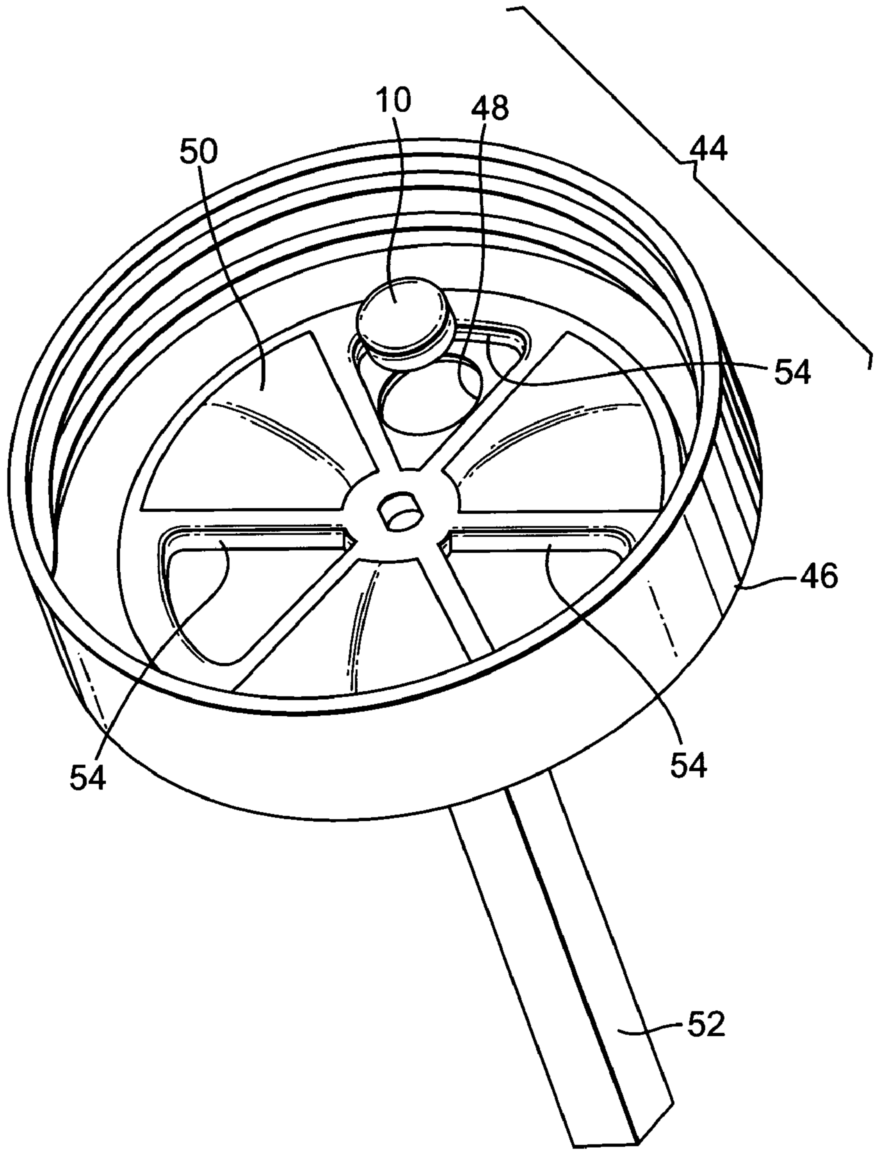
FIG. 11 is a view of the closure of FIG. 7 along with a shaft used to provide power to the closure illustrating the interaction between a tablet and the mechanical interlock.

FIG. 11 illustrates an assembled closure 44 with one of openings 54 of internal disk 50 aligned with opening 48 in cap 46 with a tablet 10 shown positioned for dispensing through the aligned openings 48, 54.

Closure 44 forms a mechanical interlock which allows tablets 10 to be dispensed from container 16 without allowing a user the ability to contact tablets 10. This may be desirable, for example, is tablets 10 are fragile or are constructed from a material which may be toxic when contacted by a user. This is especially true if cap 46 is fixedly secured over opening 18 of container 16.

While closure 44 forms a mechanical interlock allowing dispensing while preventing contact between a user and tablets 10, power to perform the dispensing operation remains in the dispenser. Rotatable shaft 52 is adapted to mate with a rotatable power source in dispenser 26' to selectively and controllably rotate rotatable shaft 52 enabling the dispensing operation to be performed. Control over rotation enables, for example, one tablet 10 to be dispensed at a time.

In an embodiment, container 16 may be distributed to a user containing tablets 10 with opening 18 secured by closure 44. Closure 44 provides a mechanical interlock preventing the dispensing of tablets 10 until dispensing is desired. At the same, power to do dispensing is obtained from dispenser 26'. Thus, the mechanical interlock of closure 44 and the power to dispense functions are separated, the former residing with container 16 and the latter residing with dispenser 26'. The power to dispense does not have to be supplied with the distributable container 16 even though container 16 provides the mechanical interlock of closure 44.

Since closure 44 is associated with container 16, a new mechanical interlock can be used each time container 16 is replaced. Such replacement will help prevent possible contamination of the mechanical interlock over time since this mechanism is replaced with a clean interlock mechanism each time container 16 is replaced. Further, modifications and improvements in the mechanical interlock can be accomplished over time without the necessity of updating dispenser 26'.

An additional security closure, for example, a security film or adhesive tab, may be employed to cover cap 46 during shipment or distribution of container 16. Alternatively, container 16 may be secured for premature dispensing of tablets 10 during distribution by positioning disk 50 so that none of openings 54 are aligned with opening 48 and mechanically securing that position, for example, by a pin which can be removed by a user prior, preferably just prior, to insertion of container 16 into dispenser 26'. After such security closure is removed, if applicable, container 16 may be mated to dispenser 26' with the power source of dispenser 26' engaging rotatable shaft 52.

Figure 12:
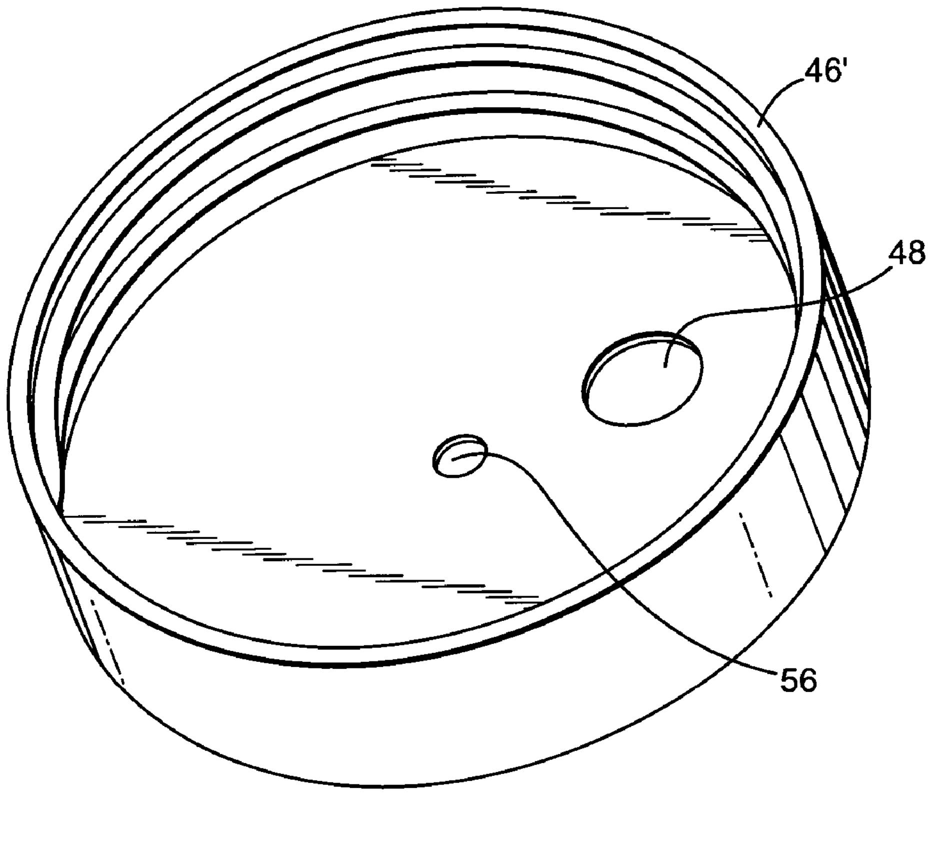
FIG. 12 is a cap used in an alternative embodiment of the present invention.
Figure 13:
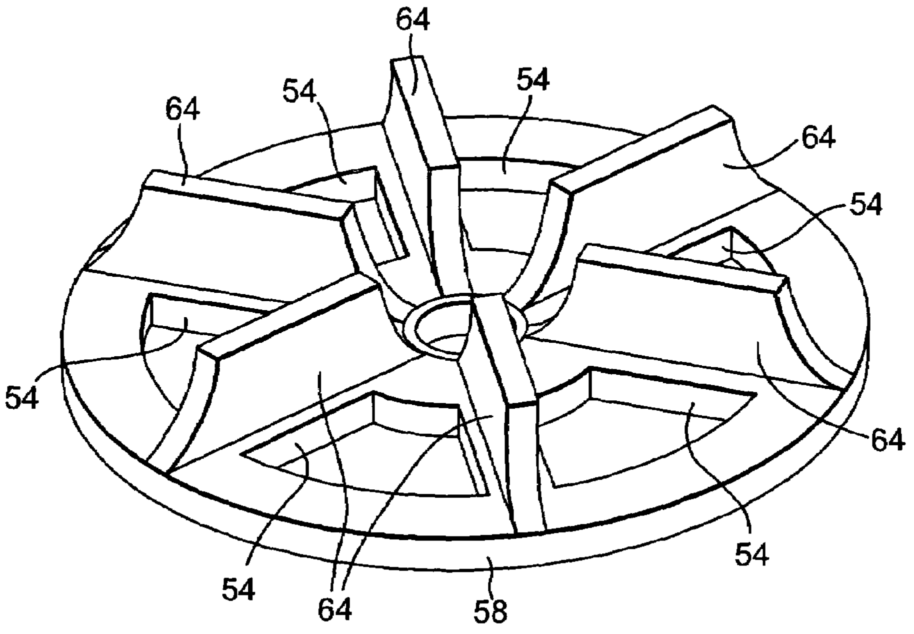
FIG. 13 is an isometric view of a rotatable disk used in an alternative embodiment of the present invention.
Figure 14:
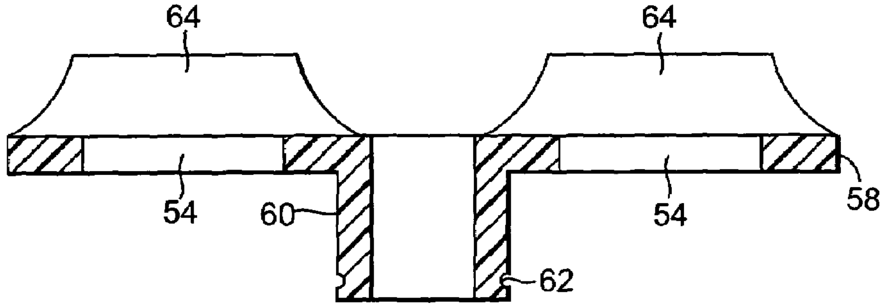
FIG. 14 is a cross-sectional view of the rotatable disk of FIG. 13.
Figure 15:
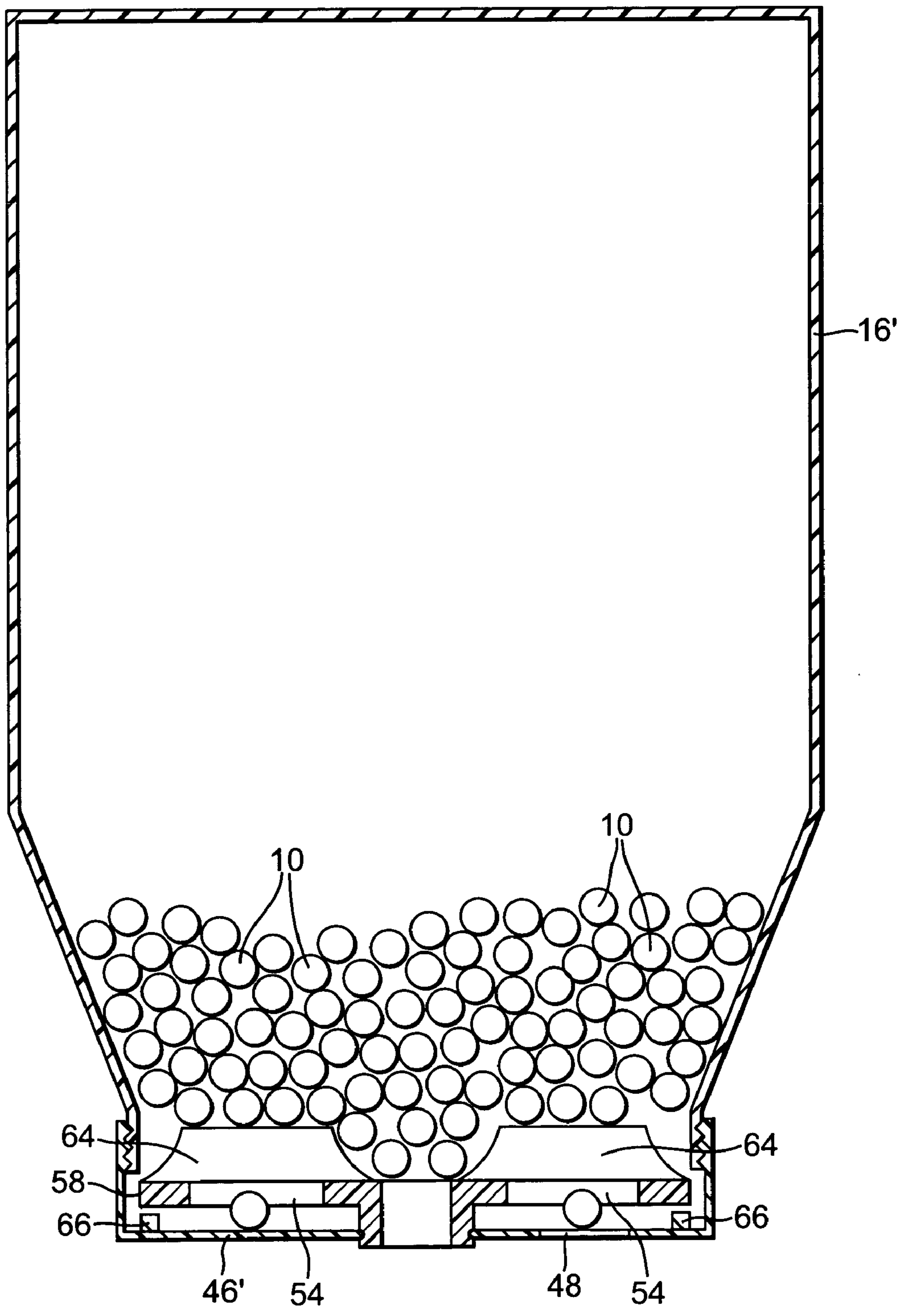
FIG. 15 is a cross-sectional view of a container constructed in accordance with an embodiment of the present invention with a closure or mechanical interlock.

FIGS. 12, 13 and 14 illustrate another alternative embodiment of the present invention. FIG. 12 illustrates cap 46' which is very similar to cap 46 illustrated in FIG. 8. Cap 46' has a central axis hole 56 and off-center opening 48. Opening 48 in cap 46' performs the same function as opening 48 in cap 46. Cap 46' has ridges and grooves for mating with grooves and ridges around the edge of opening 18 in container 16'. Rotary disk 58, illustrated in FIGS. 13 and 14, has a central shaft 60 for rotatably mounting of rotary disk 58 at groove 62 in central axis hole 56 of cap 46' such that rotary disk 58 is interior of cap 46' when cap 46' is installed on container 16'. Rotary disk has a plurality of fins 64 positioned between a plurality of openings 54. As can be seen by reference to FIG. 15, which show container 16' with cap 46' and rotary disk 58 positioned for dispensing. Tabs 66, protruding from cap 46', provide mechanical support for rotary disk 58 from the weight of tablets 10.

Fins 64 catch tablets 10 in container 16 and position tablets 10 for passage through one of openings 54 and through opening 48 when one of openings 54 and opening 48 are aligned.

Figure 16:
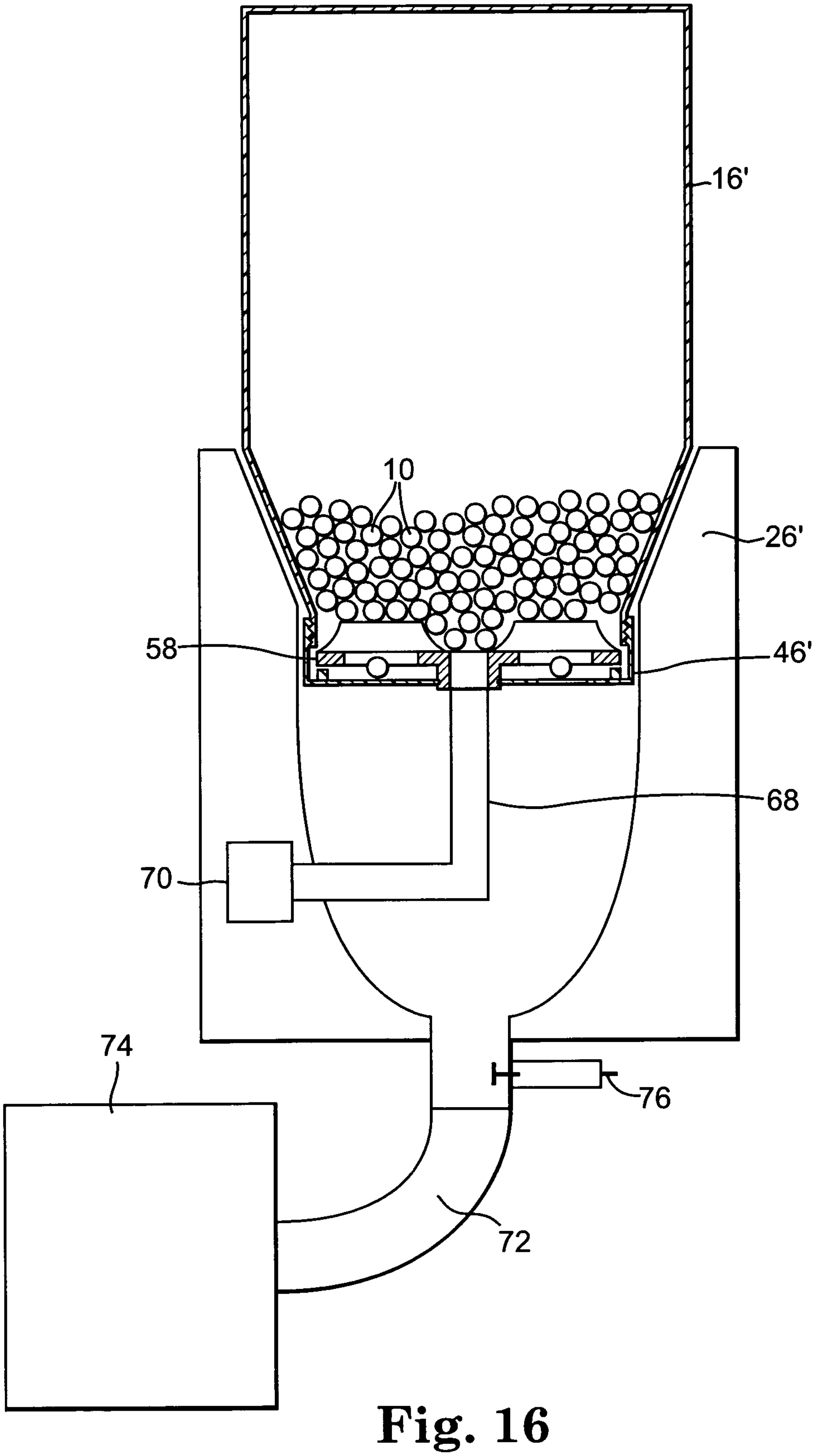
FIG. 16 is a schematic view of an alternative embodiment of the present invention illustrating a container mated with a dispenser and a cleaning machine.

Central shaft 60 of rotary disk 58 has a opening adapted to mate (FIG. 16) with a power source 68 when container 16' is inserted into dispenser 26'. Central shaft 60 has an opening configured to mate with a complementary portion of power source 68. Preferably, power source 68 provides rotary motion to rotary disk 58. Power source 68 can be controlled by motor 70, for example. Dispenser 26' is operatively coupled via passage 72 to cleaning machine 74 which can any of a variety of machines available in marketplace, such as warewashing machine. Solenoid 76 optionally can be used to seal off vapors from cleaning machine 74 when dispensing is not occurring.

Various modifications and alterations of this invention will be apparent to those skilled in the art without departing from the scope and spirit of this invention. It should be understood that this invention is not limited to the illustrative embodiments set forth above.

What is claimed is:

1. A system for dispensing a solid product, the system comprising:

a distributable container having an opening and containing said solid product; wherein said distributable container comprises:

a mechanical interlock;

a cap adapted to fit over and secure said opening of said distributable container when said mechanical interlock is not mated to a dispenser, said cap having a central axis and having an opening therein positioned off-center from said central axis; and a disc rotatably positioned about said central axis of said cap and having at least one opening therein positioned off-center from said central axis;

said dispenser fixed at a dispensing location adapted to receive said mechanical interlock of said container;

a power source operatively coupled to said dispenser and adapted to rotate said disc relative to said cap when said dispenser is mated to said mechanical interlock thereby aligning said opening on said cap and said opening on said disc to allow for dispensing of said solid product from said distributable container to said dispenser.

2. A system as in claim 1 wherein said mechanical interlock substantially prevents moisture from said dispenser from affecting said solid product.

3. A system as in claim 1 wherein said solid product comprises a plurality of tablets.

4. A system as in claim 3 wherein said plurality of tablets can be dispensed one at a time.

5. A system as in claim 1 further comprising a cleaning machine operatively coupled to said dispenser and adapted to receive said solid product dispensed from said dispenser.

6. A system as in claim 1 wherein said mechanical interlock is fixedly secured to said container.

7. A system as in claim 1 wherein said power source provides rotary motion to said disc.

8. A system as in claim 7, further comprising:

a shaft operatively rotatable by said power source and coupled to said disc such that rotation of said shaft causes rotation of said disc relative to said cap.

9. A system as in claim 1 wherein said solid product comprises bleach.

10. A system as in claim 1 wherein said solid product comprises rinse aid.

11. A system as in claim 1 wherein said solid product comprises detergent.

12. A distributable container comprising:

a receptacle having an opening and containing a dispensable product;

a mechanical interlock adapted to mate with a dispenser;

a cap adapted to fit over and secure said opening of said distributable container, said cap operable to prevent contact with said dispensable product by a user when said mechanical interlock is not mated to said dispenser and operable to provide a passageway through which said dispensable product is provided to said dispenser when said mechanical interlock is mated to said dispenser.

13. A distributable container as in claim 12 wherein said mechanical interlock substantially prevents moisture from said dispenser from affecting said dispensable product.

14. A distributable container as in claim 12 wherein said dispensable product comprises a plurality of tablets.

15. A distributable container as in claim 14 wherein said plurality of tablets can be dispensed one at a time.

16. A distributable container as in claim 12 wherein said mechanical interlock is fixedly secured to said container.

17. A distributable container as in claim 12, wherein said cap comprises a central axis and an opening positioned off-center from said central axis, the distributable container further comprising:

a disc rotably positioned about said central axis of said cap and having at least one opening therein positioned off-center from said central axis; and a shaft operatively coupled to said disc such that rotation of said shaft causes rotation of said disc relative to said cap thereby enabling alignment of said opening on said cap with said opening on said disc to allow for dispensing of said dispensable product to said dispenser.

18. A distributable container as in claim 12 wherein said dispensable product comprises bleach.

19. A distributable container as in claim 12 wherein said dispensable product comprises rinse aid.

20. A distributable container as in claim 12 wherein said dispensable product comprises detergent.

21. A method of dispensing a dispensable product to a dispenser fixed at a dispensing location, wherein said method comprises:

providing a distributable container containing said dispensable product and having an opening, a mechanical interlock operable to mate with said dispenser, a cap covering said opening of said distributable container when said mechanical interlock is not mated to said dispenser and having a central axis and an opening therein positioned off-center from said central axis, and a disc rotatably positioned about said central axis of said cap and having at least one opening therein positioned off-center from said central axis;

mating said mechanical interlock of said container with said dispenser; and generating rotation by said disc relative to said cap thereby aligning said opening on said cap with said opening on said disc, wherein said alignment causes said dispensable product to be dispensed from said distributable container to said dispenser.

22. A method as in claim 21 wherein said mechanical interlock substantially prevents moisture from outside of said container from affecting said dispensable product.

23. A method as in claim 21 wherein said dispensable product comprises a plurality of tablets.

24. A system as in claim 21 wherein said mechanical interlock is fixedly secured to said container.

25. A method as in claim 21 wherein said power provides rotary motion to said mechanical interlock.

26. A method as in claim 21 wherein said dispensable product comprises bleach.

27. A method as in claim 21 wherein said dispensable product comprises rinse aid.

28. A method as in claim 21 wherein said dispensable product comprises detergent.

* * * * *

UNITED STATES PATENT AND TRADEMARK OFFICE
CERTIFICATE OF CORRECTION

PATENT NO. : 6,991,131 B2
APPLICATION NO. : 10/653673
DATED : January 31, 2006
INVENTOR(S) : Bryan A. Maser It is certified that error appears in the above-identified patent and that said Letters Patent is hereby corrected as shown below:

Col. 10, Line 5, “said solid product; wherein said” should be --said solid product wherein said--

Signed and Sealed this

Seventeenth Day of October, 2006

JON W. DUDAS
*Director of the United States Patent and Trademark Office*